US009348655B1

United States Patent
Tsirkin et al.

(10) Patent No.: US 9,348,655 B1
(45) Date of Patent: *May 24, 2016

(54) MIGRATING A VM IN RESPONSE TO AN ACCESS ATTEMPT BY THE VM TO A SHARED MEMORY PAGE THAT HAS BEEN MIGRATED

(71) Applicant: Red Hat Israel, LTD, Raanana (IL)

(72) Inventors: Michael S. Tsirkin, Yokneam Illit (IL); David A. Gilbert, Manchester (GB)

(73) Assignee: Red Hat Israel, Ltd., Raanana (IL)

( * ) Notice: Subject to any disclaimer, the term of this patent is extended or adjusted under 35 U.S.C. 154(b) by 4 days.

This patent is subject to a terminal disclaimer.

(21) Appl. No.: 14/546,330

(22) Filed: Nov. 18, 2014

(51) Int. Cl.
*G06F 9/50* (2006.01)
*G06F 9/455* (2006.01)

(52) U.S. Cl.
CPC .......... *G06F 9/5088* (2013.01); *G06F 9/45558* (2013.01); *G06F 9/5016* (2013.01); *G06F 2009/4557* (2013.01); *G06F 2209/5021* (2013.01)

(58) Field of Classification Search
None
See application file for complete search history.

(56) References Cited

U.S. PATENT DOCUMENTS

| 7,925,850 | B1 * | 4/2011 | Waldspurger | G06F 9/4856 711/162 |
|---|---|---|---|---|
| 8,239,609 | B2 | 8/2012 | Hudzia et al. | |
| 8,533,713 | B2 | 9/2013 | Dong | |
| 8,903,888 | B1 * | 12/2014 | Hyser | G06F 9/45558 709/202 |
| 8,977,736 | B2 * | 3/2015 | Nelson | G06F 9/45558 709/223 |
| 2009/0276774 | A1 * | 11/2009 | Kinoshita | G06F 21/6218 718/1 |
| 2012/0102084 | A1 | 4/2012 | Hiltunen et al. | |
| 2014/0019621 | A1 | 1/2014 | Khan et al. | |
| 2014/0196037 | A1 | 7/2014 | Gopalan | |

OTHER PUBLICATIONS

Michael R. Hines et al., "Post-Copy Based Live Virtual Machine Migration Using Adaptive Pre-Paging and Dynamic Self-Ballooning," VEE, Mar. 11-13, 2009, 10 pages, ACM, Washington, DC, USA.
Walter Cerroni, "Multiple Virtual Machine Live Migration in Federated Cloud Systems," Department of Electrical, Electronic and Information Engineering, University of Bologna, Italy, 2014, 30 pages, Bologna, Italy.
Aidan Shribman et al., "Pre-Copy and Post-Copy VM Live Migration for Memory Intensive Applications," Euro-Par 2012: Parallel Processing Workshops, Lecture Notes in Computer Science, 2013, pp. 539-547, vol. 7640, Springer.

(Continued)

*Primary Examiner* — Abdullah Al Kawsar
*Assistant Examiner* — Jorge A Chu Joy-Davila
(74) *Attorney, Agent, or Firm* — Lowenstein Sandler LLP

(57) ABSTRACT

A hypervisor of a source host receives a request to migrate a group of virtual machines from the source host to a destination host. The hypervisor of the source host determines that a first virtual machine being migrated to the destination host shares a memory space on the source host with a second virtual machine on the source host. Upon receiving a request from the second virtual machine on the source host to access a first memory page of the shared memory space on the source host that has been migrated to the destination host, the hypervisor of the source host initiates migration of the second virtual machine to the destination host.

20 Claims, 5 Drawing Sheets

(56) References Cited

OTHER PUBLICATIONS

Xiang Song et al., "Parallelizing Live Migration of Virtual Machines," VEE, Mar. 16-17, 2013, pp. 85-95, Houston, Texas, USA.

Yingwei Luo et al., "Live and Incremental Whole-System Migration of Virtual Machines Using Block-Bitmap," Peking University and Michigan Technological University, 8 pages, Retrieved from the Internet on Nov. 11, 2014, World Wide Web: cs.mtu.edu/~zlwang/papers/cluster08.pdf.

\* cited by examiner

MIGRATING A VM IN RESPONSE TO AN ACCESS ATTEMPT BY THE VM TO A SHARED MEMORY PAGE THAT HAS BEEN MIGRATED

TECHNICAL FIELD

The present disclosure is generally related to computer systems, and more particularly, to group migration in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system."

In multiple host environments, a running virtual machine or group of virtual machines can be moved from one host to another without disconnecting or terminating the virtual machine. Memory, storage, and network connectivity of the virtual machines can be transferred from the source host machine to a destination host machine. The process is referred to as "live migration" or "group migration."

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
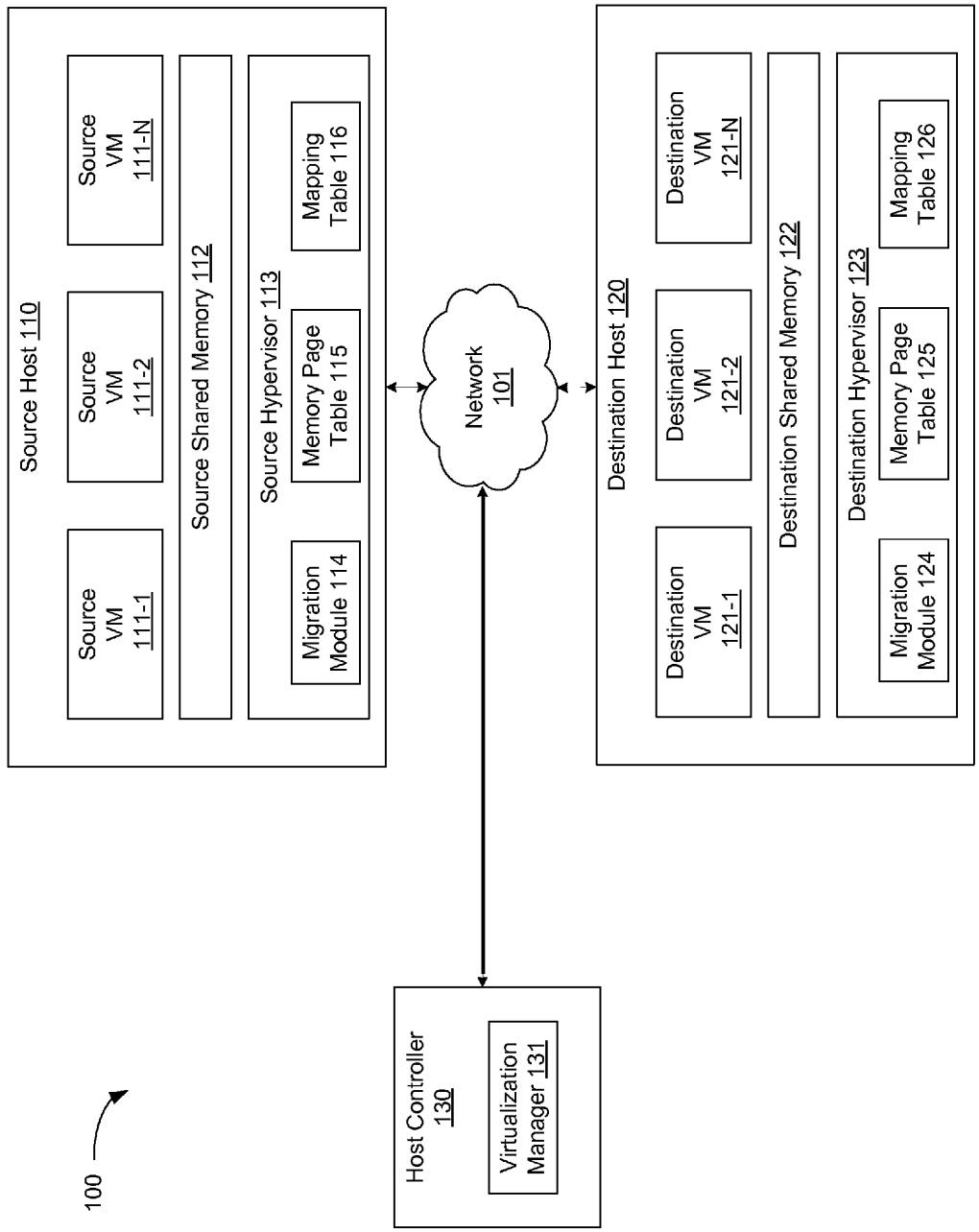
FIG. 1 depicts a high-level component diagram of an example computer system architecture, in accordance with one or more aspects of the present disclosure.

Described herein are methods and systems by which a memory space shared by group of virtual machines may be migrated from a source host to a destination host. Methods of group migration may include "pre-copy" and "post-copy" techniques. Pre-copy techniques can involve sending a copy of the state of a virtual machine to the destination host while the virtual machine continues to execute on the source host. If some memory pages change during the process, they can be re-copied until there are very few changes remaining on the source, at which point the virtual machine can be stopped on the source and restarted on the destination. Post-copy techniques can involve suspending the virtual machine on the source, copying a subset of the state of the virtual machine to the destination, and then resuming the virtual machine on the destination. If a post-copied virtual machine attempts to access a page of its own memory that has not been migrated, the attempted access can generate a fault and the requesting virtual machine can stop executing until the memory is pulled from the source host.

Employing these techniques can be effective with individual virtual machines because their migration can be treated independently from other virtual machines in a group. However, when a group of virtual machines share an area of memory that any virtual machine in the group may update at any time, employing traditional techniques for virtual machine migration can make managing continuing updates to the shared memory space untenable. Migration for each of the virtual machines in a group may not complete at the same time, which can result in extended latency and downtime for virtual machines that should wait for the entire shared memory space to be migrated. Particularly, employing traditional techniques to shared memory can prevent a consistent view of the shared memory across the group of virtual machines during migration and may require stopping all of the virtual machines in the group that access the shared memory until migration of the shared memory has been completed.

Aspects of the present disclosure address the above noted deficiency by employing modified post-copy techniques for pages of memory in a memory space shared among a group of virtual machines being migrated between hosts. In an illustrative example, a group of virtual machines that share a memory space on a source host can be migrated from the source host to a destination host. The migration may be initiated by a virtualization management system, the hypervisor on the source host, or in any other similar manner. The hypervisor on the source host may migrate the group of virtual machines using pre-copy techniques, post-copy techniques, or a combination of the two. The hypervisor on the source host can determine that a virtual machine of the group of virtual machines on the source host has been migrated to a destination host. In certain implementations, the hypervisor can determine that the first virtual machine has been migrated to the destination host by determining that a portion of the state of the virtual machine has been migrated to the destination host. The portion of the state of the virtual machine may comprise a predetermined state of various components of the virtual machine that are necessary for the virtual machine to begin execution on the destination host. For example, the portion of the virtual machine may comprise a device state, the state of CPU registers, the pages of memory that are currently being accessed by the virtual machine, or the like. The state of the virtual machine may be migrated by copying the state from the source host to the destination host directly through the network, placing the state in a shared space for the destination host to retrieve, or in any other manner.

The hypervisor on the source host may then determine that the virtual machine that has been migrated shares a memory space on the source host with the other virtual machines in the group of virtual machines that should be migrated to the destination host. In some implementations, the hypervisor on the source host may identify an area of memory as shared by the group of virtual machines by using a mapping table, a configuration file, an area within the memory page table of the host operating system, or in any other similar manner. For example, the hypervisor may store a unique identifier in a mapping table for the virtual machine that references the memory page addresses that are shared with other virtual machines in the group.

The hypervisor on the source host may begin migrating pages of the shared memory space to the destination host at the same time that the group of virtual machines are being migrated. The hypervisor may send the contents of shared memory pages by copying the contents from the source host to the destination host directly through the network, placing the contents in a shared space for the destination host to retrieve, or in any other manner. Alternatively, the hypervisor on the source host may wait to migrate the pages of the shared memory space until a request is received from the destination host. Upon receiving a request from the destination host for a memory page that has not yet been migrated to the destination host, the hypervisor may migrate the memory page to the destination host and designate that memory page as not present on the source host.

In some implementations, the hypervisor on the source host may maintain the status of migrated memory pages of the shared memory space to determine the status of the overall migration. For example, the hypervisor may store a status flag or a total number of migrated pages in a mapping table. Upon determining that the number of migrated memory pages of the shared memory space meets a predetermined threshold condition, the hypervisor may designate the migration of the shared memory space complete and notify the destination host accordingly.

In some implementations, the hypervisor on the source host may employ both methods of migrating the contents of the shared memory space. For example, the hypervisor on the source host may begin sending pages of share memory space to the destination host as resources are made available, but prioritize sending a particular page of shared memory to the destination host if a request is received for that particular page. Once the hypervisor on the source host migrates a page of shared memory to the destination host, the hypervisor on the source host may then designate that page of shared memory as not present on the source host. In one illustrative example, the hypervisor on the source host may modify the valid bit of the page table entry for the shared memory page within the memory page table of the host operating system. Alternatively, the hypervisor may save the state of the memory page within a separate mapping table in hypervisor accessible memory.

Upon determining that the first virtual machine shares the memory space on the source host with the other virtual machines in the group of virtual machines that should be migrated to the destination host, the hypervisor may begin monitoring the shared memory space for accesses of the other virtual machines in the group. In certain implementations, the hypervisor on the source host may receive a request to access a memory page of the shared memory space from one of the virtual machines that has not yet been migrated. If the hypervisor on the source host determines that the requested memory page of the shared memory space has not yet been migrated to the destination host, the hypervisor on the source host may allow the non-migrated virtual machine to access the shared memory page. Alternatively, the hypervisor may prevent any virtual machine still running on the source host from accessing any memory page from the shared memory space that is still on the source host.

If the hypervisor on the source host determines that the requested memory page of the shared memory space has been migrated to the destination host (e.g., the requested page has been designated as not present on the source host), the hypervisor may then stop execution of the virtual machine that issued the request on the source host and migrate that virtual machine to the destination host.

Once a portion of the state of any virtual machine of the group of virtual machines from the source host has been migrated to a destination host, the hypervisor of the destination host may start executing that virtual machine on the destination host. A virtual machine that was stopped on a source host because it attempted to access a page of shared memory that had already been migrated to the destination host should be migrated to, and then started on, the destination host seamlessly. Once migrated to the destination host, the virtual machine will then be able to access the page of shared memory on the destination host.

Subsequently, the hypervisor of the destination host may receive a request from the migrated virtual machine for a page of memory from the shared memory space on the destination host. Upon determining that the requested memory page of the shared memory space is missing on the destination host, the hypervisor of the destination host may pause the execution of the virtual machine that issued the request. In one illustrative example, the hypervisor may make this determination by referencing the valid bit of the page table entry for the shared memory page within the memory page table of the destination host operating system.

The hypervisor of the destination host may then retrieve the missing memory page from the source host. In some implementations, the hypervisor of the destination host may send a request to the source host for the missing shared memory page. Once the request is sent, the hypervisor on the destination host may designate the missing shared memory page on the destination host as having been requested. This may be accomplished by using a mapping table, a configuration file, an area within the memory page table of the destination host operating system, or in any other similar manner. The hypervisor of the destination host may monitor the status of missing memory pages on a time interval and resend any request that has not been fulfilled by the source host if a predefined period of time has elapsed since the request was sent to the source host. The hypervisor of the destination host may then receive the missing shared memory page from the source host and subsequently designate that memory page as present on the destination host.

Aspects of the present disclosure are thus capable of reducing latency and downtime for migrated virtual machines that share memory across a group, while maintaining a consistent view of the shared memory across all virtual machines in the group during the migration process. More particularly, aspects of the present disclosure allow seamless migration of a group of virtual machines by migrating shared memory such that it is transparent to the virtual machines, thereby reducing latency, downtime, and resulting page faults.

FIG. 1 depicts a high-level component diagram of an illustrative example of a network architecture 100, in accordance with one or more aspects of the present disclosure. One skilled in the art will appreciate that other architectures for network architecture 100 are possible, and that the implementation of a network architecture utilizing examples of the invention are not necessarily limited to the specific architecture depicted by FIG. 1.

The network architecture 100 includes one or more source hosts 110 coupled to one or more destination hosts 120 over a network 101. The network 101 may be a private network (e.g., a local area network (LAN), wide area network (WAN), intranet, etc.) or a public network (e.g., the Internet). The source hosts 110 and destination hosts 120 may also be coupled to a host controller 130 (via the same or a different network or directly). Host controller 130 may be an independent machine such as a server computer, a desktop computer, etc. Alternatively, the host controller 130 may be part of the source host 110 or destination host 120.

Source Host 110 may comprise server computers or any other computing devices capable of running one or more source virtual machines (VMs) 111-1 through 111-N where N is a positive integer. Each source VM 111 is a software implementation of a machine that executes programs as though it was a physical machine. Each source VM 111 may run a guest operating system (OS) that may be different from one virtual machine to another. The guest OS may include Microsoft Windows, Linux, Solaris, Mac OS, etc. The source host 110 may comprise source shared memory 112, a memory space that is shared among a group of source VMs 111.

The source host 110 may additionally comprise a source hypervisor 113 that emulates the underlying hardware platform for the source VMs 111. The source hypervisor 113 may also be known as a virtual machine monitor (VMM) or a kernel-based hypervisor. The source hypervisor 113 may comprise migration module 114, memory page table 115, and mapping table 116. Migration module 114 can manage the source-side tasks required for migration of a group of VMs (e.g., source VMs 111) that are running on source host 110 as well as the shared memory of the group (e.g., source shared memory 112) to a destination host 120, as described in detail below with respect to FIGS. 2 and 3. The migration module 114 can initiate migration of a group of VMs 111, monitor the status of the migration state of each VM during migration, migrate memory pages from source shared memory 112 to destination host 120, and service requests received from destination host 120 for missing shared memory pages.

The migration module 114 may store information regarding page migration status for later use in memory page table 115 or mapping table 116. For example, upon migrating a page of shared memory from source shared memory 112, migration module 114 may modify the corresponding page table entry in memory page table 115 to designate the memory page as not present. Additionally, migration module 114 may store unique identifiers in a mapping table 116 that associate the group of VMs 111 to the page addresses of source shared memory 112 that are shared by the group.

Destination Host 120 may comprise server computers or any other computing devices capable of running one or more destination virtual machines (VMs) 121-1 through 121-N where N is a positive integer. Each destination VM 121 is a software implementation of a machine that executes programs as though it was a physical machine. Each destination VM 121 may run a guest operating system (OS) that may be different from one virtual machine to another. The guest OS may include Microsoft Windows, Linux, Solaris, Mac OS, etc. The destination host 120 may comprise destination shared memory 122, a memory space that is shared among a group of destination VMs 121.

The destination host 120 may additionally comprise a destination hypervisor 123 that emulates the underlying hardware platform for the destination VMs 121. The destination hypervisor 123 may also be known as a virtual machine monitor (VMM) or a kernel-based hypervisor. The destination hypervisor 123 may comprise migration module 124, memory page table 125, and mapping table 126. Migration module 124 can manage the destination-side tasks for migration of a group of VMs (e.g., destination VMs 121) with the shared memory of the group (e.g., destination shared memory 122), as described in detail below with respect to FIG. 4. The migration module 124 can complete the migration of a group of destination VMs 121, start each destination VMs 121 on destination host 120, and send requests to source host 110 for memory pages missing from destination shared memory 122.

The migration module 124 may store information regarding page migration status for later use in memory page table 125 or mapping table 126. For example, upon receiving a missing memory page from source host 110, migration module 124 may modify the corresponding page table entry in memory page table 125 to designate the memory page as present. Additionally, migration module 124 may store unique identifiers in a mapping table 126 that associate the group of destination VMs 121 to the page addresses of destination shared memory 122 that are shared by the group. Moreover, migration module 124 may use mapping table 126 to store the status of requests submitted to source host 110 for missing memory pages (e.g., to indicate that particular memory pages of shared memory have been requested from the source host, received successfully from the source host, are present in destination shared memory 122, etc.).

A host controller 130 can manage the source VMs 111 and destination VMs 121. Host controller 130 may manage the allocation of resources from source host 110 to source VMs 111, the allocation of resources from destination host 120 to destination VMs 121. In addition, host controller 130 may initiate the migration of a group of source VMs 111 with their associated source memory 112 to destination host 120. In some implementations host controller 130 may run on a separate physical machine from source host 110 and destination host 120. Alternatively, host controller 130 may run locally on either source host 110 or destination host 120. The host controller 130 may include a virtualization manager 131 to perform the management operations described above.

Figure 2:
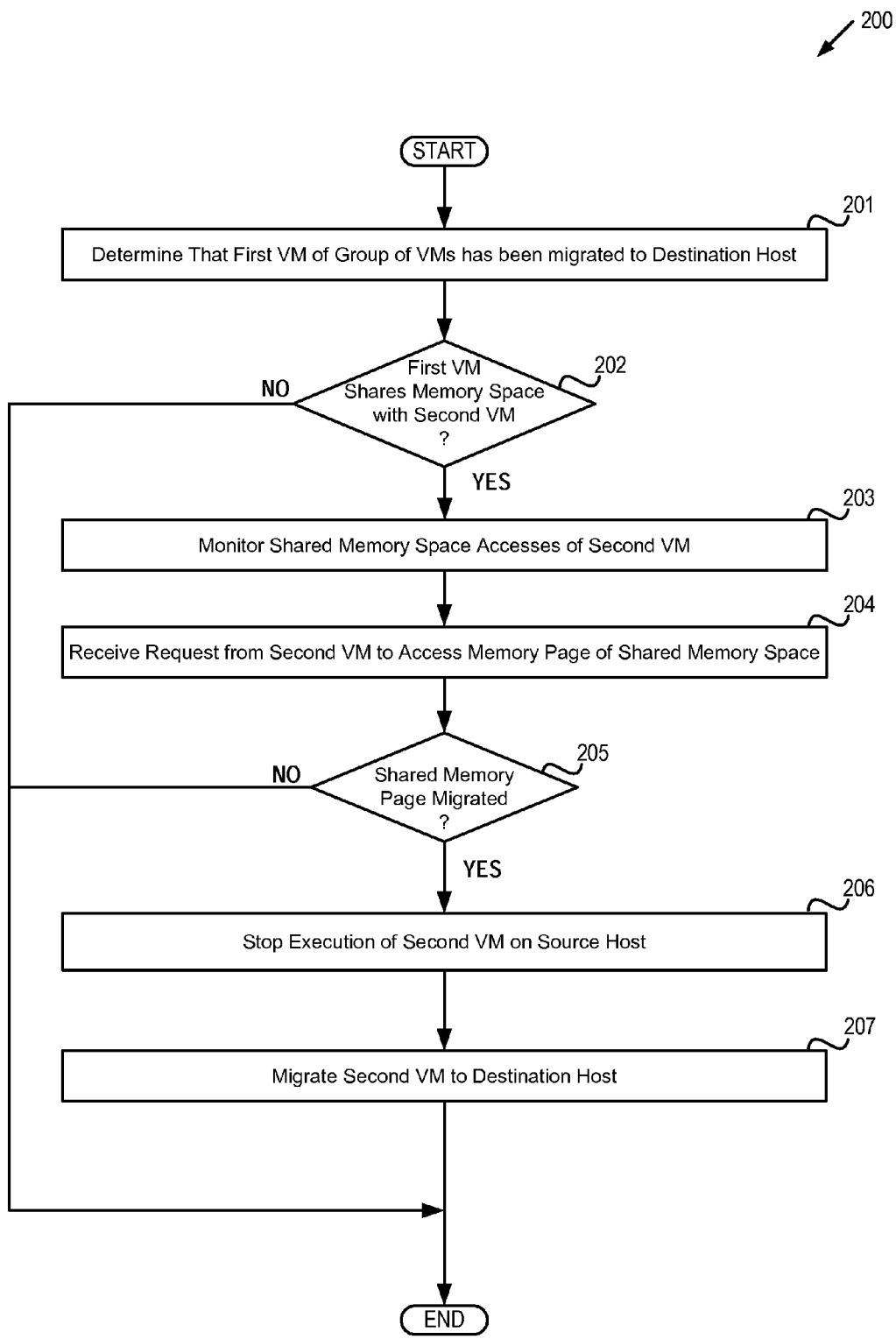
FIG. 2 depicts a flow diagram of a method for migrating shared memory for a group of virtual machines, in accordance with one or more aspects of the present disclosure.

FIG. 2 depicts a flow diagram of an example method 200 for migrating shared memory for a group of virtual machines. The method may be performed by processing logic that may comprise hardware (circuitry, dedicated logic, etc.), software (such as is run on a general purpose computer system or a dedicated machine), or a combination of both. In one illustrative example, method 200 may be performed by migration module 114 of source hypervisor 113 in FIG. 1. Alternatively, some or all of method 200 might be performed by another machine. It should be noted that blocks depicted in FIG. 2 could be performed simultaneously or in a different order than that depicted.

At block 201, processing logic determines that a first virtual machine of a group of virtual machines has been migrated to a destination host. In certain implementations, processing logic can determine that the first virtual machine has been migrated to the destination host by determining that a portion of the state of the virtual machine has been migrated to the destination host. The portion of the state of the virtual machine may comprise a predetermined state of various components of the virtual machine that are necessary for the virtual machine to begin execution on the destination host. For example, the portion of the virtual machine may comprise a device state, the state of CPU registers, the pages of memory that are currently being accessed by the virtual machine, or the like. The state of the virtual machine may be migrated by copying the state from the source host to the destination host directly through the network, placing the state in a shared space for the destination host to retrieve, or in any other manner.

At block 202, processing logic determines whether the first virtual machine shares a memory space with a second virtual machine of the group of virtual machines. If not, the method of FIG. 2 terminates. Otherwise, execution continues to block 203. In some implementations, processing logic may identify an area of memory as shared by a group of virtual machines by using a mapping table, a configuration file, an area within the memory page table of the host operating system, or in any other similar manner. For example, processing logic may store a unique identifier in a mapping table for the virtual machine that references the memory page addresses that are shared with other virtual machines in a group.

At block 203, processing logic begins monitoring shared memory space accesses of the second virtual machine. At block 204, processing logic receives a request from the second virtual machine to access a memory page of the shared memory space. At block 205, processing logic determines whether the shared memory page requested by the second virtual machine has been migrated to the destination host (e.g., the memory page has been designated as not present on the source host). If not, the method of FIG. 2 terminates. Otherwise, execution continues to block 206.

At block 206, processing logic stops execution of the second virtual machine on the source host. At block 207, processing logic migrates the second virtual machine to the destination host. Processing logic may migrate the second virtual machine using pre-copy techniques, post-copy techniques, or a combination of the two. Processing logic may migrate the second virtual machine to the destination by copying the state of the second virtual machine from the source host to the destination host directly through the network, placing the state in a shared space for the destination host to retrieve, or in any other manner. After block 207, the method of FIG. 2 terminates.

Figure 3:
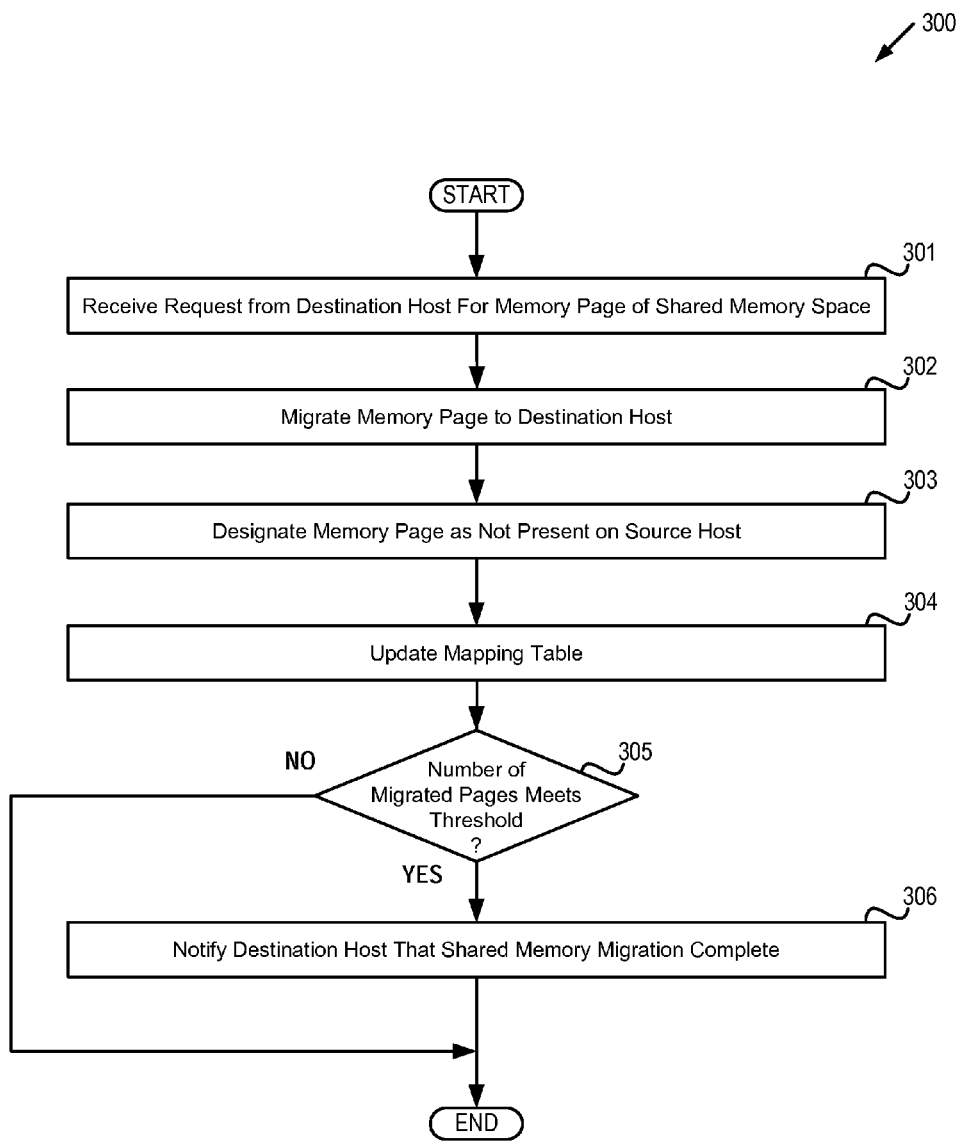
FIG. 3 depicts a flow diagram of a method for migrating a page of shared memory requested by a destination host, in accordance with one or more aspects of the present disclosure.

FIG. 3 depicts a flow diagram of an example method 300 for migrating a page of shared memory requested by a destination host. The method may be performed by processing logic that may comprise hardware (circuitry, dedicated logic, etc.), software (such as is run on a general purpose computer system or a dedicated machine), or a combination of both. In one illustrative example, method 300 may be performed by migration module 114 of source hypervisor 113 in FIG. 1. Alternatively, some or all of method 300 might be performed by another machine. It should be noted that blocks depicted in FIG. 3 could be performed simultaneously or in a different order than that depicted.

At block 301, processing logic receives a request from a destination host for a memory page of shared memory space on a source host. At block 302, processing logic migrates the requested memory page to the destination host. Processing logic may send the contents of shared memory pages by copying the contents from the source host to the destination host directly through the network, placing the contents in a shared space for the destination host to retrieve, or in any other manner.

At block 303, processing logic designates the migrated memory page as not present on the source host. For example, processing logic may modify the valid bit of the page table entry for the shared memory page within the memory page table of the host operating system. Alternatively, processing logic may save the state of the memory page within a separate mapping table in hypervisor accessible memory.

At block 304, processing logic updates a mapping table to maintain the status of migrated memory pages of the shared memory space. For example, processing logic may store a status flag or a total number of migrated pages in a mapping table. At block 305, processing logic determines if the migrated number of pages meets a predetermined threshold condition. If not, the method of FIG. 3 ends. Otherwise, execution proceeds to block 306.

At block 306, processing logic notifies the destination host that the shared memory migration has completed. After block 306, the method of FIG. 3 terminates.

Figure 4:
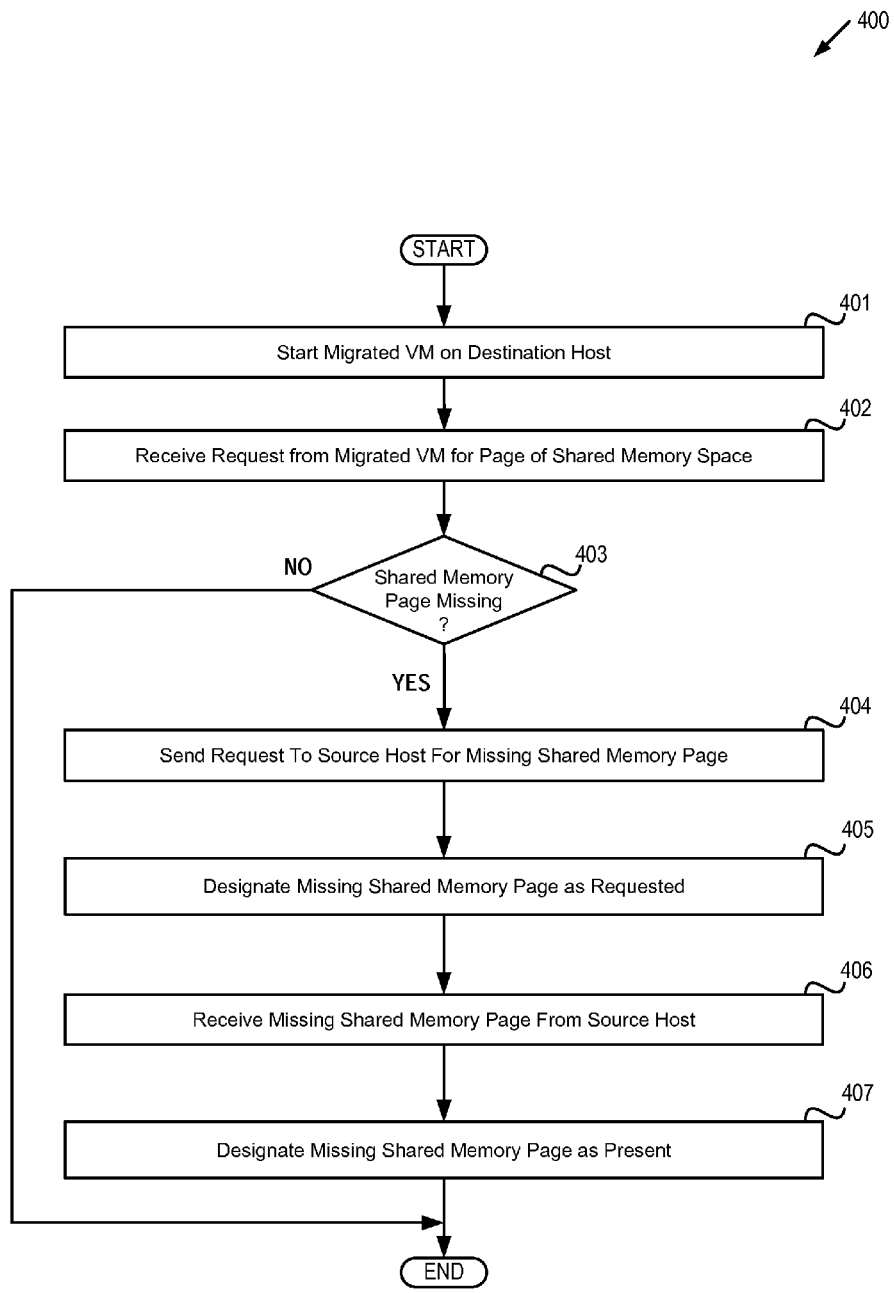
FIG. 4 depicts a flow diagram of a method for requesting missing shared memory pages by a destination host, in accordance with one or more aspects of the present disclosure.

FIG. 4 depicts a flow diagram of an example method 400 for requesting missing shared memory pages by a destination host. The method may be performed by processing logic that may comprise hardware (circuitry, dedicated logic, etc.), software (such as is run on a general purpose computer system or a dedicated machine), or a combination of both. In one illustrative example, method 400 may be performed by migration module 124 of destination hypervisor 123 in FIG. 1. Alternatively, some or all of method 400 might be performed by another machine. It should be noted that blocks depicted in FIG. 4 could be performed simultaneously or in a different order than that depicted.

At block 401, processing logic starts a migrated virtual machine on the destination host. In some implementations, the virtual machine is started once a portion of the state of the virtual machine from the source host has been migrated to a destination host. The portion of the state of the virtual machine may comprise a predetermined state of various components of the virtual machine that are necessary for the virtual machine to begin execution on the destination host. For example, the portion of the virtual machine may comprise a device state, the state of CPU registers, the pages of memory that are currently being accessed by the virtual machine, or the like. A virtual machine that was stopped on a source host because it attempted to access a page of shared memory that had already been migrated to the destination host will be migrated to then started on the destination host seamlessly.

At block 402, processing logic receives a request from a migrated virtual machine for a page of memory from a shared memory space on the destination host. At block 403, processing logic determines whether the requested page of shared memory is missing from the shared memory space on the destination host. In one illustrative example, processing logic may make this determination by referencing the valid bit of the page table entry for the shared memory page within the memory page table of the destination host operating system. If the requested page is not missing, the method of FIG. 4 ends. Otherwise, execution proceeds to block 404.

At block 404, processing logic sends a request to the source host for the missing memory page. At block 405, processing logic designates the requested missing memory page as requested. In some implementations, processing logic may accomplish this using a mapping table, a configuration file, an area within the memory page table of the destination host operating system, or in any other similar manner. At block 406, processing logic receives the missing shared memory page from the source host. At block 407, processing logic designates the missing memory page as present on the destination host. After block 407, the method of FIG. 4 terminates.

Figure 5:
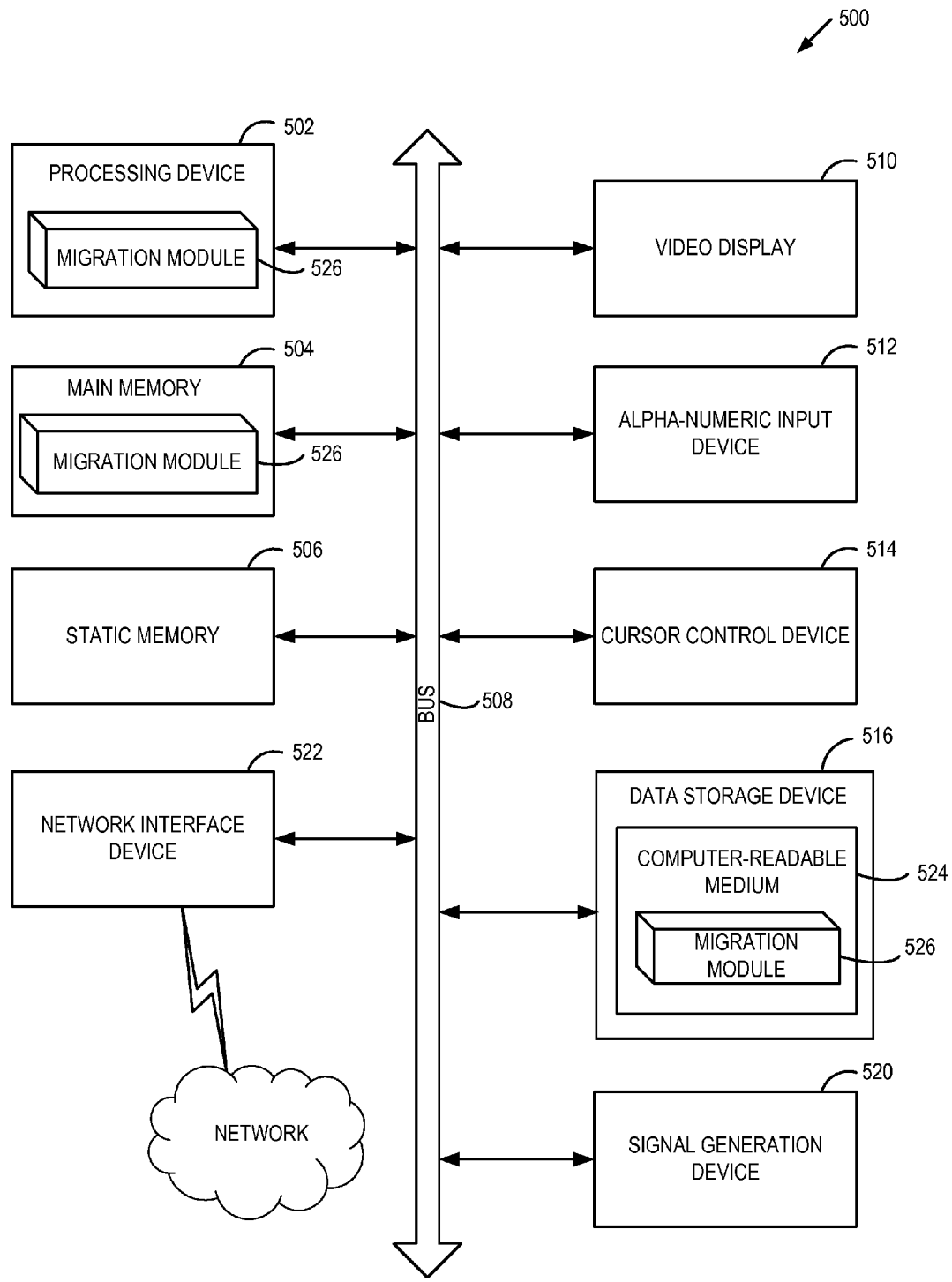
FIG. 5 depicts a block diagram of an illustrative computer system operating in accordance with examples of the invention.

FIG. 5 depicts an example computer system 500 which can perform any one or more of the methods described herein. In one example, computer system 500 may correspond to network architecture 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute migration module 526 for performing the operations and steps discussed herein (e.g., corresponding to the methods of FIGS. 2-4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a computer-readable medium 524 on which is stored migration module 526 (e.g., corresponding to the methods of FIGS. 2-4, etc.) embodying any one or more of the methodologies or functions described herein. Migration module 526 may also reside, completely or at least partially, within the main memory 504 and/or within the processing device 502 during execution thereof by the computer system 500, the main memory 504 and the processing device 502 also constituting computer-readable media. Migration module 526 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "identifying," "stopping," "migrating," "designating," "notifying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   determining, by a processing device executing a hypervisor on a source host, that a first virtual machine of a group of virtual machines on the source host has been migrated to a destination host;
   responsive to determining that the first virtual machine shares one or more pages of a memory space on the source host with a second virtual machine of the group of virtual machines on the source host, monitoring, by the hypervisor of the source host, shared memory space accesses of the second virtual machine;
   receiving, by the hypervisor of the source host, a request from the second virtual machine on the source host to access a first memory page of the one or more pages of the shared memory space on the source host; and
   responsive to determining that the first memory page of the one or more pages of the shared memory space on the source host has been migrated to the destination host, stopping, by the hypervisor of the source host, execution of the second virtual machine on the source host, and migrating, by the hypervisor of the source host, the second virtual machine to the destination host.

2. The method of claim 1 further comprising:
   receiving, by the hypervisor of the source host, a request from the destination host for a second memory page of the one or more pages of the shared memory space on the source host;
   migrating, by the hypervisor of the source host, the second memory page of the one or more pages of the shared memory space on the source host to the destination host; and
   designating, by the hypervisor of the source host, the second memory page of the one or more pages of the shared memory space on the source host as not present.

3. The method of claim 2 further comprising:
   responsive to determining that a number of memory pages of the one or more pages of the shared memory space remaining on the source host meets a predetermined threshold condition, notifying, by the hypervisor of the source host, the destination host that shared memory transfer has completed.

4. The method of claim 1 wherein determining that the first virtual machine has been migrated to the destination host comprises determining that a portion of a state of the first virtual machine has been migrated to the destination host, the portion of the state of the first virtual machine comprising a device state, a CPU register state, and a RAM pages state.

5. The method of claim 1 wherein the hypervisor of the destination host is to:
   start the first virtual machine on the destination host;
   receive a request from the first virtual machine for a page of the one or more pages of the shared memory space;
   responsive to determining that the requested memory page of the one or more pages of the shared memory space is missing from the destination host, pause the execution of the first virtual machine;
   retrieve the missing shared memory page from the source host; and
   resume execution of the first virtual machine.

6. The method of claim 5 wherein to retrieve the missing shared memory page, the hypervisor of the destination host is to:
   send a request to the source host for the missing shared memory page;
   designate the missing shared memory page on the destination host as having been requested;
   receive the missing shared memory page from the source host; and
   designate the missing shared memory page on the destination host as present.

7. The method of claim 5 wherein the hypervisor of the destination host is further to:
   start the second virtual machine on the destination host.

8. A computing apparatus comprising:
   a memory to store instructions; and
   a processing device, operatively coupled to the memory, to execute the instructions, wherein the processing device is to:
      determine, by the processing device executing a hypervisor on a source host, that a first virtual machine of a group of virtual machines on the source host has been migrated to a destination host;
      responsive to determining that the first virtual machine shares one or more pages of a shared memory space on the source host with a second virtual machine of the group of virtual machines on the source host, monitor, by the hypervisor of the source host, shared memory space accesses of the second virtual machine;

receive, by the hypervisor of the source host, a request from the second virtual machine on the source host to access a first memory page of the one or more pages of the shared memory space on the source host; and responsive to determining that the first memory page of the one or more pages of the shared memory space on the source host has been migrated to the destination host, stop, by the hypervisor of the source host, execution of the second virtual machine on the source host, and migrate, by the hypervisor of the source host, the second virtual machine to the destination host.

9. The apparatus of claim 8 wherein the processing device is further to:

receive, by the hypervisor of the source host, a request from the destination host for a second memory page of the one or more pages of the shared memory space on the source host;

migrate, by the hypervisor of the source host, the second memory page of the one or more pages of the shared memory space on the source host to the destination host; and designate, by the hypervisor of the source host, the second memory page of the one or more pages of the shared memory space on the source host as not present.

10. The apparatus of claim 9 wherein the processing device is further to:

responsive to determining that a number of memory pages of the one or more pages of the shared memory space remaining on the source host meets a predetermined threshold condition, notify, by the hypervisor of the source host, the destination host that shared memory transfer has completed.

11. The apparatus of claim 8 wherein the first virtual machine of the source host and the second virtual machine of the source host are part of a group of virtual machines being migrated to the destination host.

12. The apparatus of claim 8, wherein the hypervisor of the destination host is to:

start the first virtual machine on the destination host;

receive a request from the first virtual machine for a page of the one or more pages of the shared memory space;

responsive to determining that the requested memory page of the one or more pages of the shared memory space is missing from the destination host, pause the execution of the first virtual machine;

retrieve the missing shared memory page from the source host; and resume execution of the first virtual machine.

13. The apparatus of claim 12, wherein to retrieve the missing shared memory page, the hypervisor of the destination host is to:

send a request to the source host for the missing shared memory page;

designate the missing shared memory page on the destination host as having been requested;

receive the missing shared memory page from the source host; and designate the missing shared memory page on the destination host as present.

14. The apparatus of claim 8, wherein the hypervisor of the destination host is further to:

start the second virtual machine on the destination host.

15. A non-transitory computer readable storage medium, having instructions stored therein, which when executed by a processing device of a computer system, cause the processing device to:

determine, by the processing device executing a hypervisor on a source host, that a first virtual machine of a group of virtual machines on the source host has been migrated to a destination host;

responsive to determining that the first virtual machine shares one or more pages of a shared memory space on the source host with a second virtual machine of the group of virtual machines on the source host, monitor, by the hypervisor of the source host, shared memory space accesses of the second virtual machine;

receive, by the hypervisor of the source host, a request from the second virtual machine on the source host to access a first memory page of the one or more pages of the shared memory space on the source host; and responsive to determining that the first memory page of the one or more pages of the shared memory space on the source host has been migrated to the destination host, stop, by the hypervisor of the source host, execution of the second virtual machine on the source host, and migrate, by the hypervisor of the source host, the second virtual machine to the destination host.

16. The non-transitory computer readable storage medium of claim 15, wherein the processing device is further to:

receive, by the hypervisor of the source host, a request from the destination host for a second memory page of the one or more pages of the shared memory space on the source host;

migrate, by the hypervisor of the source host, the second memory page of the one or more pages of the shared memory space on the source host to the destination host; and designate, by the hypervisor of the source host, the second memory page of the one or more pages of the shared memory space on the source host as not present.

17. The non-transitory computer readable storage medium of claim 16, wherein to determine that the first virtual machine has been migrated to the destination host, the processing device is to determine that a portion of a state of the first virtual machine has been migrated to the destination host, the portion of the state of the first virtual machine comprising a device state, a CPU register state, and a RAM pages state.

18. The non-transitory computer readable storage medium of claim 15, wherein the hypervisor of the destination host is to:

start the first virtual machine on the destination host;

receive a request from the first virtual machine for a page of the one or more pages of the shared memory space;

responsive to determining that the requested memory page of the one or more pages of the shared memory space is missing from the destination host, pause the execution of the first virtual machine;

retrieve the missing shared memory page from the source host; and resume execution of the first virtual machine.

19. The non-transitory computer readable storage medium of claim 18, wherein to retrieve the missing shared memory page, the hypervisor of the destination host is to:

send a request to the source host for the missing shared memory page;

designate the missing shared memory page on the destination host as having been requested;

receive the missing shared memory page from the source host; and designate the missing shared memory page on the destination host as present.

20. The non-transitory computer readable storage medium of claim 18, wherein the hypervisor of the destination host is further to:
start the second virtual machine on the destination host.

* * * * *